(12) United States Patent
De Block

(10) Patent No.: US 6,634,056 B1
(45) Date of Patent: Oct. 21, 2003

(54) WIPING DEVICE FOR GLASS SURFACES OF MOTOR VEHICLES

(75) Inventor: Peter De Block, Halen (BE)

(73) Assignee: Robert Bosch GmbH, Stuttgart (DE)

( * ) Notice: Subject to any disclaimer, the term of this patent is extended or adjusted under 35 U.S.C. 154(b) by 131 days.

(21) Appl. No.: 09/869,474

(22) PCT Filed: Sep. 28, 2000

(86) PCT No.: PCT/DE00/03392
§ 371 (c)(1),
(2), (4) Date: Jun. 28, 2001

(87) PCT Pub. No.: WO01/30623
PCT Pub. Date: May 3, 2001

(30) Foreign Application Priority Data

Oct. 28, 1999 (DE) .......................... 199 52 054

(51) Int. Cl.$^7$ .................................. B60S 1/40
(52) U.S. Cl. .................. 15/250.32; 15/250.43
(58) Field of Search ........................ 15/250.32, 250.361, 15/250.43, 250.44

(56) References Cited

U.S. PATENT DOCUMENTS

| 2,932,843 | A | * | 4/1960 | Zaiger et al. | ............. | 15/250.32 |
| 2,946,078 | A | * | 7/1960 | Deibel et al. | ............. | 15/250.32 |
| 2,974,341 | A | * | 3/1961 | Hart | ................. | 15/250.32 |
| 4,195,382 | A | | 4/1980 | Macpherson | ............. | 15/250.32 |

FOREIGN PATENT DOCUMENTS

DE 2 313 689 10/1974
GB 2 044 082 A 10/1980

* cited by examiner

Primary Examiner—Gary K. Graham
(74) Attorney, Agent, or Firm—Michael J. Striker

(57) ABSTRACT

A wiper apparatus is proposed, which serves to clean windows of motor vehicles. The wiper apparatus (10) has a driven wiper arm (12) guided on one end on the motor vehicle, on the free end (11) of which arm an elongated wiper blade (14) that can be pressed with a wiper strip (18) against the window (20) is separably pivotably connected via a connection device (16), which on the side toward the arm has a pivot bolt (40) whose hinge axis extends essentially transversely to the longitudinal direction of the wiper blade (14) and which toward the wiper blade, in a middle portion of the wiper blade on its side remote from the window, has a coupling part (34) with a bearing recess (54) for the pivot bolt (40), which can be introduced into the bearing recess (54) via a mounting channel (48), and the insertion opening (52) of the mounting channel is disposed on the side of the coupling part (34) remote from the window (20). The mounting channel (48) has two partial channels (50 and 51), which form an angle aα of less than 180° with one another, and the one partial channel (50) has the insertion opening (52) for the pivot bolt (40), while the other partial channel (51) opens into the bearing recess (54), and if furthermore in the operating position of the wiper apparatus, a shoulder (65) oriented transversely to the wiper blade (14) and securing the pivot bolt and its bearing recess, of the wiper arm (12) cooperates with a counterpart shoulder (66), associated with it of the wiper blade (14).

13 Claims, 3 Drawing Sheets

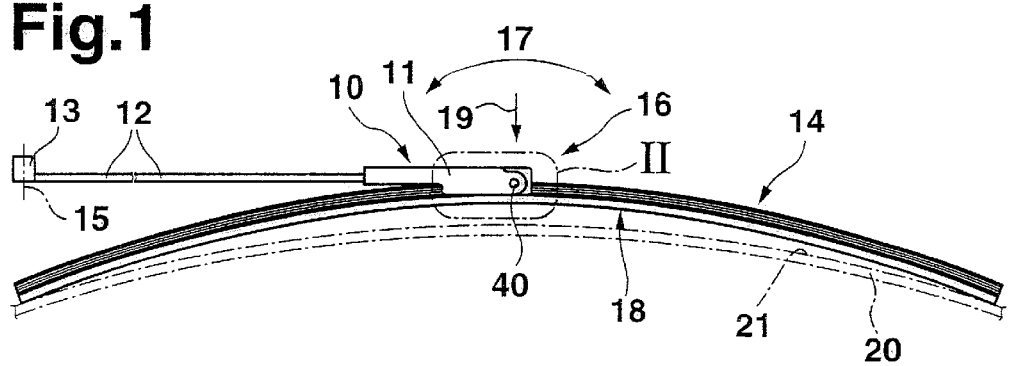
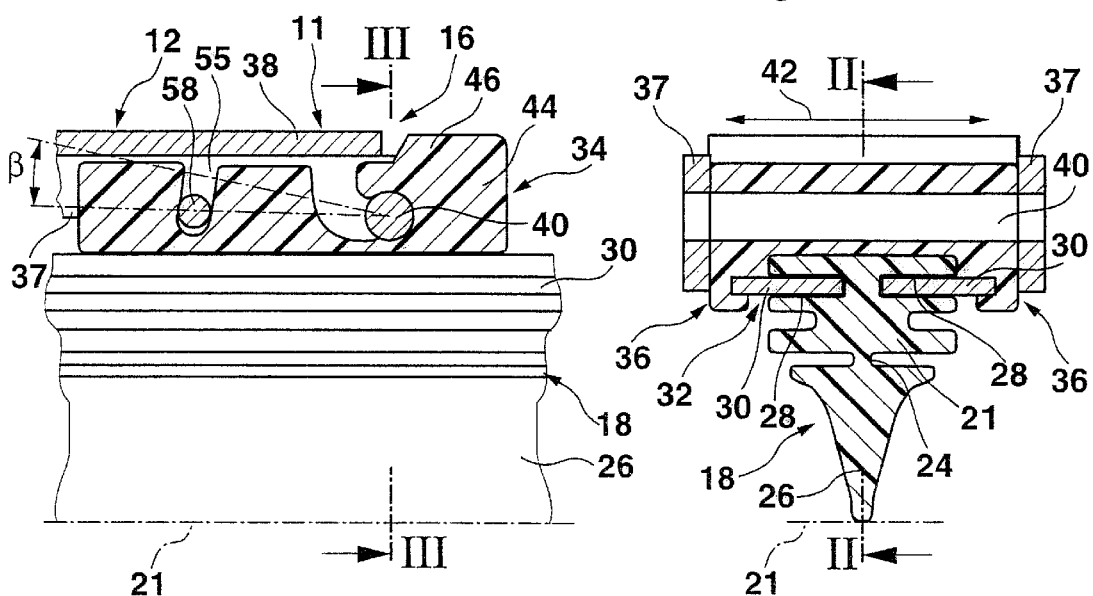
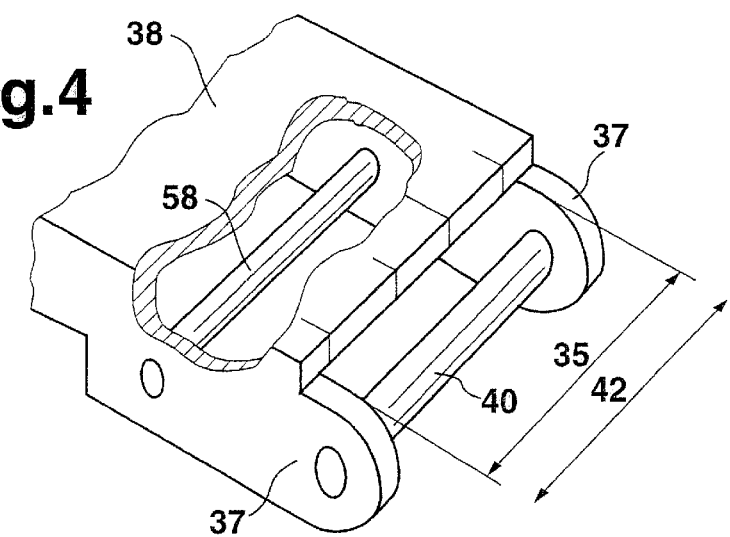

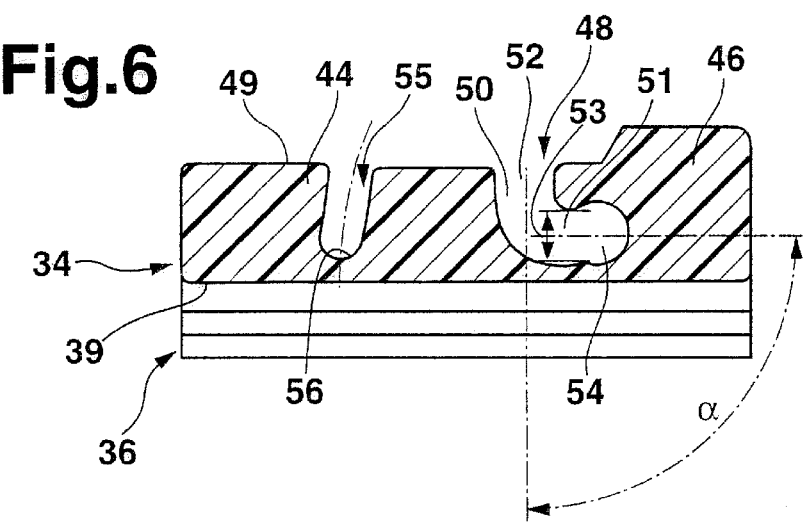
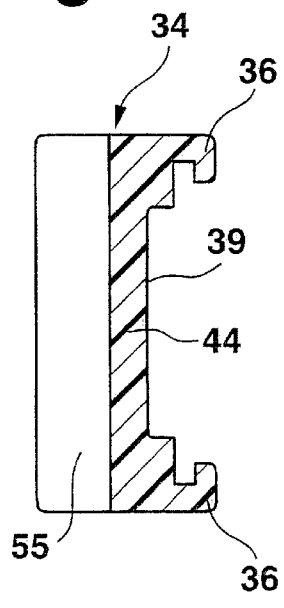
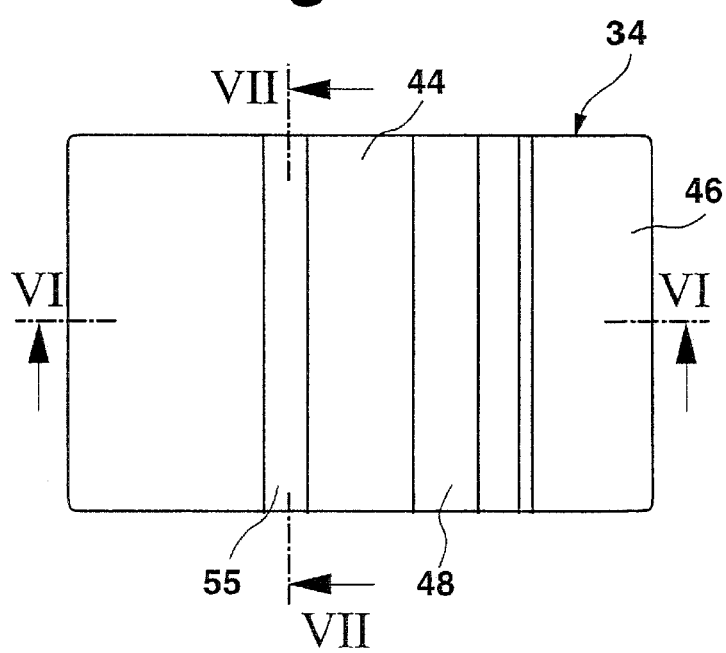

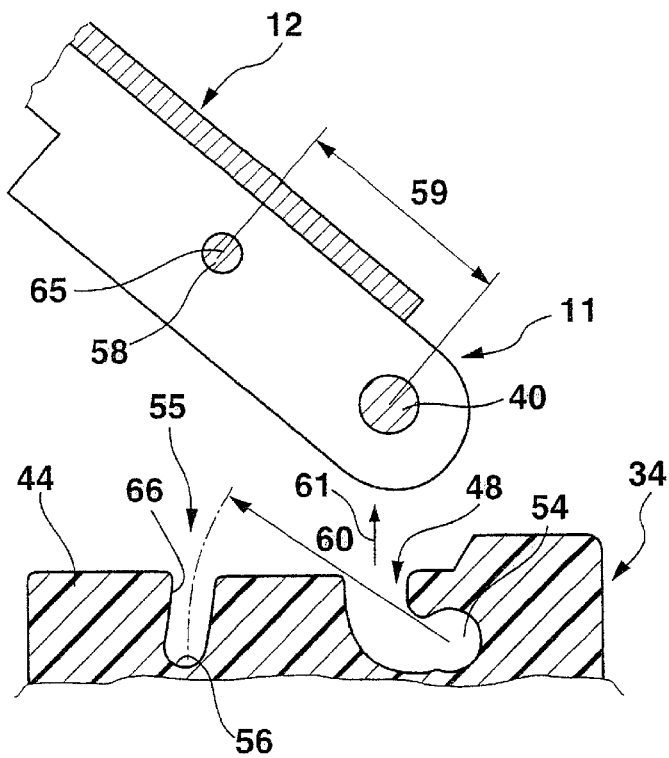
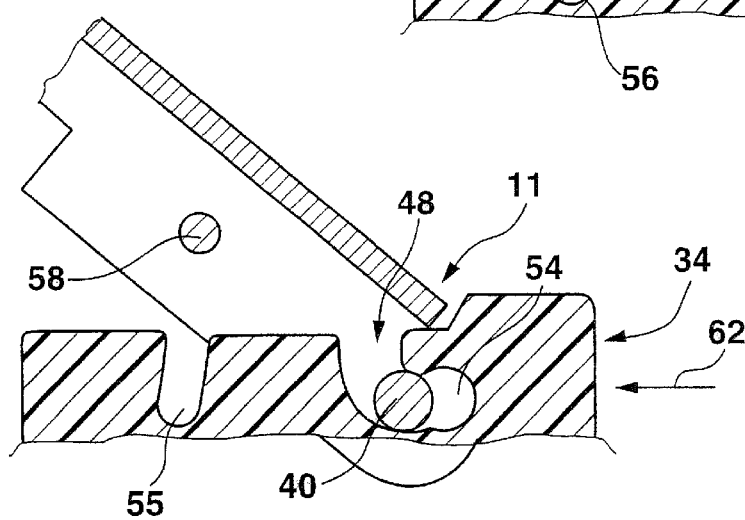
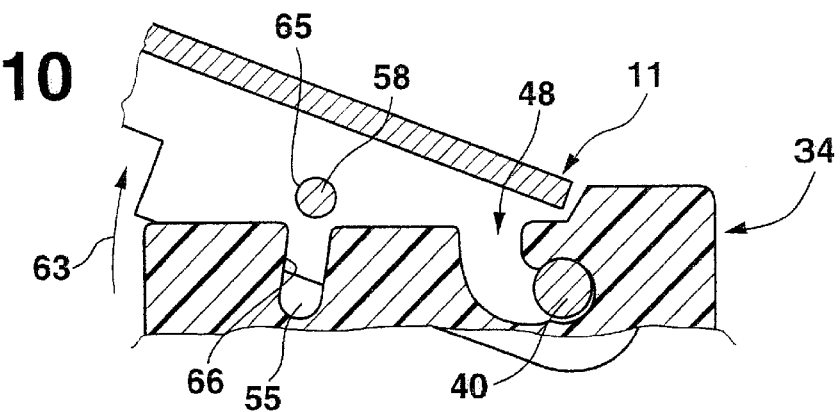

WIPING DEVICE FOR GLASS SURFACES OF MOTOR VEHICLES

BACKGROUND OF THE INVENTION

The invention is based on a wiper apparatus. In a known wiper apparatus of this type (German patent disclosure DE 23 13 689 A1), the wiper blade, or its coupling part, that belongs to the wiper apparatus has a guide channel that is open toward a base body of the wiper strip, and in this channel, a hairpin-shaped securing spring is displaceable between a mounting position and a locking position. This securing spring serves to open and close a recess which is disposed in the coupling part and which represents the bearing recess for the wiper arm pivot bolt. The securing spring is prestressed toward the head strip of the wiper strip, so that to displace the spring, the friction between the rubber and the spring has to be overcome. On the one hand, it should be easy for the user to slide the spring, for instance when changing wiper blades, but on the other, the spring must reliably close the bearing recess in the channel wall during wiper operation, so that the wiper blade cannot become disconnected from the wiper arm unintentionally. These two mutually contradictory demands cannot both be met equally well.

SUMMARY OF THE INVENTION

In the wiper blade of the invention, securing the pivot bolt and the mounting channel is assured, viewed perpendicular to the window, by the channel wall of the other partial channel that discharges into the bearing recess. The securing shoulder of the wiper arm prevents the pivot bold from creeping out of its bearing recess during wiper operation, in cooperation with the counterpart shoulder of the wiper blade.

To achieve especially good securing of the pivot bolt in its bearing recess, the other partial channel, opening into the bearing recess, extends in a plane that is at least approximately parallel to the window.

If the one partial channel, having the insertion opening, extends in a plane perpendicular to the window, then the wiper blade can be joined to the wiper arm in a simple way.

If furthermore the two partial channels form an angle α of 90° with one another, the result is an especially reliable connection between the wiper arm and the wiper blade.

In a further development of the invention, the coupling part is made from an elastically yielding plastic, and the mounting channel in its width has a partial constriction, whose width is less than the diameter of the pivot bolt. As a result, securing against unintentional separation of the wiper blade from the wiper arm is achieved when the wiper arm is hinged away from the window, because the pivot bolt is snapped into the bearing recess of the wiper blade, with the constriction being temporarily spread open.

An especially compact design of the wiper apparatus is obtained if the securing shoulder of the wiper arm is disposed between pivot bolt and the guided end of the wiper arm.

Advantages in terms of production are obtained if the counterpart shoulder of the wiper blade is embodied on the coupling part.

In a further feature of the invention, the wiper arm has a U-shaped cross section on its free end, the two legs of which U extend, fitting over the longitudinal sides of the coupling part, from the base of the U to the window, and the ends of the pivot bolt are retained on the two legs of the U. The result is especially good wiper blade guidance during wiping operation.

In a further development of the concept of the invention, the securing shoulder of the wiper arm is embodied on the jacket face of a support bolt, which is disposed with spacing from the pivot bolt and is retained with both of its ends at the two legs of the U of the wiper arm. By this provision, complicated and expensive production or mounting steps can be omitted.

If furthermore the counterpart shoulder of the wiper blade is embodied on the side wall, remote from the pivot bolt, of a transverse groove that is disposed in the coupling part and is open on the side of the coupling part remote from the window, further simplifications in production are obtained in terms of the embodiment of the wiper blade counterpart shoulder.

So that the securing shoulder of the wiper arm, during the pivoting motion of the wiper blade, the axis of the pivot bolt can always cooperate with the counterpart shoulder of the wiper blade, the transverse groove extends from its opening to the groove bottom along a circular path whose radius corresponds to the spacing between the pivot bolt and the support bolt. As a result, the hinge connection between the wiper arm and the wiper blade is kept free of play at all times in every operating position of the wiper apparatus, and the pivot bolt bearing is relieved.

To achieve an especially low structural design for the wiper apparatus, with the attendant advantages, the coupling part is disposed on the band side, remote from the window, of a band-like elongated, spring-elastic support element for the wiper strip. The wiper strip itself is located on the other, lower band side of the support element, facing toward the window.

Further advantageous refinements and features of the invention are given in the ensuing description of an exemplary embodiment shown in the associated drawing.

BRIEF DESCRIPTION OF THE DRAWINGS

Shown in the drawing are:

FIG. 1, a side view of the wiper apparatus of the invention;

FIG. 2, a detailed marked II, shown enlarged and in section longitudinally of the wiper blade, with the wiper arm and the wiper blade in the operating position relative to one another;

FIG. 3, a cross section through the arrangement of FIG. 2, in a section taken along the line III—III;

FIG. 4, the free end of the wiper arm that belongs to the wiper apparatus, show enlarged and in perspective;

FIG. 5, a plan view on a coupling part toward the wiper blade and belonging to the wiper apparatus;

FIG. 6, a section taken along the line VI—VI through the coupling part of FIG. 5;

FIG. 7, a section the line VI—VI through the coupling part of FIG. 5;

FIG. 7, a section taken along the line VII—VII through the coupling part of FIG. 5; and FIGS. 8–10, fragmentary sectional views of the coupling part and the wiper arm with successive mounting steps between the wiper blade and the free end of the wiper arm, the free end being shown in longitudinal section.

DETAILED DESCRIPTION OF THE PREFERRED EMBODIMENTS

A wiper apparatus 10 shown in FIG. 1 includes a driven wiper arm 12, guided at one end on the motor vehicle, which is shown shortened in FIG. 1. The free end of the wiper arm 12 has been identified by reference numeral 11 in FIG. 1. The other end of the wiper arm 12, guided on the motor vehicle, has been provided with reference numeral 13. In the exemplary embodiment, the wiper arm swings transversely to the point of the drawing about a swing axis 15 located on the end 13. The wiper apparatus 10 also includes an elongated wiper blade 14, which is pivotably and separably joined to the free end of the wiper arm 12 via a connection device 16. The wiper arm 10 and thus also the wiper blade 14 are urged in the direction of the arrow 19 toward the window 20 to be wiped (FIG. 1), shown in dot-dashed lines, whose surface to be wiped is identified in FIG. 1 by the line 21. Since this e line 21 is meant to represent the most pronounced curvature of the window, it is quite clear that the curvature of the wiper blade, pressed against the window without loading on its two ends, is greater than the maximum curvature of the window. Under the contact pressure (arrow 19), the wiper blade presses with its wiper lip 26 over its entire length against the window surface 21. In a spring-elastic, elongated support element 32 for the wiper strip 18, a stress builds up which assures proper contact of the wiper strip or the wiper lip over its entire length against the window. Since as a rule the spherically curved windows are not portions of spherical surfaces, the wiper blade 14 must be capable during its working motion of constantly adapting relative to the wiper arm 12 to the position at the time, or the course at the time, of the window surface 21. The connection device 16 is therefore embodied simultaneously as a hinge connection between the wiper arm 12 and the wiper blade 14, and the axis of this hinge or joint extends essentially in the wiping direction, so that the wiper blade during the wiping motion can swivel about this axis in the direction of the double-headed arrow 17 (FIG. 1). As FIGS. 2 and 3 in particular show, the wiper blade 14 has an elongated, rubber-elastic wiper strip 18, with which it can be pressed against the window 20 to be wiped, which is shown in FIG. 1. The wiper strip 18 has a top strip 22, to which a wiper lip 26 that takes on the actual wiping work is joined via a tilting rib 24. It can also be seen from FIG. 3 that in the longitudinal sides of the top strip 22, opposite one another in terms of the plane of symmetry located perpendicular to the window 20, there are two longitudinal grooves 28, which each serve to receive one bandlike, elongated spring rail 30. The spring rails 30 together form a support element 32 for the wiper strip 18. The embodiment of the support element 32 as a bandlike, elongated spring rail makes an especially low and therefore advantageous design of the wiper apparatus possible. It does not matter whether—as in the exemplary embodiment—the support element 32 comprises a plurality of longitudinal spring rails 30, or the support element is a one-piece spring band on whose underside, toward the window 20, the wiper strip is secured. The outer longitudinal edges of the spring rails 30, facing away from one another, protrude out of their longitudinal grooves 28, at least in the middle portion of the wiper blade. FIGS. 1–3 also show that in the longitudinal middle portion of the wiper blade 14, on the upper band side of the support element 32 remote from the window, there is a coupling part 34 that belongs to the connection device 16. This substantially block-shaped coupling part 34 fits with clawlike extensions 36 around the two free, outer peripheral regions of the spring rails 30 and thus secures them in their longitudinal grooves 28. By suitable provisions, the coupling part 34 is joined solidly to the spring rail 30 and is thus nondisplaceable longitudinally of the wiper blade. The middle portion—on which the coupling part 34 can be disposed—extends over a certain longitudinal portion between the two ends of the wiper blade and can be determined from one case to another depending on the design of the wiper blade. The special embodiment of the coupling part 34 and the connection device 16 is shown by the two drawings in FIGS. 2 and 3, of which FIG. 2 shows the coupling part in longitudinal section, while the wiper strip 18 disposed on the lower band side of the support element 32, toward the window 20, is shown together with its spring rails 30 in front elevation. On its free end, the wiper arm 12 has a U-shaped cross section (FIGS. 2–4), so that two legs 36 of the U facing one another at a distance and extending longitudinally of the wiper arm are the result; the legs of the U are joined together by the base of the U 38 on the top side of the wiper arm, facing away from the window. The two ends of a pivot bolt 40 are retained on the two legs 36 of the U, near the free end 11 of the wiper arm 12. The pivot bolt 40 extends essentially in the direction of motion of the wiper arm, which is represented in FIG. 4 by a double-headed arrow 42. For the sake of easier mounting of the wiper blade 14 on the wiper arm 12, the base of the U 38 is removed from the free end 11 of the wiper arm 12 in the region of the pivot bolt 40 (FIG. 4).

The coupling part 34 will be described in further detail below, in conjunction with FIGS. 5–7 in particular. It has a substantially block-shaped body 44 having the claws 36, by way of which the body can be joined solidly to the support element 32 of the wiper blade 14 in the manner already described. For receiving the part of the top strip 22 that protrudes past the support element 32, the body 44 has a groove-like longitudinal cutout 39 on its underside (FIGS. 6 and 7). Viewed longitudinally of the body 44, this body has a protrusion 46 on its top 49, pointing away from the retaining claws 36, that serves during operation of the wiper apparatus to cover the front end edge of the wiper arm 12 (FIG. 2). In its longitudinal middle portion, the body 44 is provided with a mounting channel 48, which is disposed transversely to the longitudinal extent of the coupling part 34. The mounting channel 34 is open toward the top side 49 of the body 45. It has two partial channels 50 and 51, of which the first partial channel 50 discharges at the top side 49 and is adjoined in its further course by the other mounting channel 51. The other partial channel 51 extends in a plane that is approximately parallel to the window, while the mounting channel 48, which has an insertion opening 52 of the top side 49, extends in a plane that is perpendicular to the window 20. As FIGS. 2 and 6 in particular show, the course of the other mounting channel 41 points away from the swing axis 15 (FIG. 1) of the wiper arm 12 and discharges into a bore-like bearing recess 54. The two partial channels 50 and 51 thus form an angle α with one another, which in the exemplary embodiment amounts to 90°. FIG. 6 also shows that in the transitional region between the other partial channel 51 and the bearing recess 54, a constriction 53 is provided, which constricts the width of the partial channel 51 so that the wall of the bearing recess 54 has a wrap angle of more than 180°. Spaced apart from the mounting channel 48, toward the swing axis 15, a transverse groove 55 is disposed in the body 44 of the coupling part 34; the transverse groove also discharges at the top side 49 of the body 44. From its orifice or opening, the transverse groove 55 extends to the groove bottom 56 along a circular path, whose center is identical to the center of the bore-like bearing recess 54 (FIG. 8).

As FIGS. 4 and 8 show, a support bolt 58 is disposed, with a spacing distance 59 from the pivot bolt 40, between the pivot bolt in the guided end 13 of the wiper arm 12 on the free end of the wiper arm 12, and the two ends of this support bolt are likewise retained on the leg 37 of the U of the wiper arm end 11. The support bolt 58 extends essentially parallel to the pivot bolt 40. The axial spacing between the support bolt 58 and the pivot bolt 40 has been identified in FIG. 8 by reference numeral 59. This axial spacing 59 corresponds to the radius 60 of the circular path along which the transverse groove 55 extends in its depth (FIG. 8).

To connect the wiper blade 14 to the wiper arm 12, these two components must be put in a position relative to one another that is shown in FIG. 8. After that, the wiper blade 14 with its coupling part 34 is moved in the direction of the arrow 61 toward the wiper arm 12 in such a way that its pivot bolt 40, via the insertion opening 52, enters the mounting channel 48 (see FIG. 9). After that, the wiper blade with its coupling part 34 is displaced in the direction of the arrow 62, until the pivot bolt 40 is located in the bearing recess 54. Overcoming the constriction 53 is possible because the coupling part 34 is made from a plastic that has a certain elasticity, so that if a certain force is extended, the pivot bolt is capable of temporarily widening the constriction, whose width is less than the diameter of the pivot bolt 40. In the bearing position shown in FIG. 10, the constriction then resumes its original shape, so that the pivot bolt 40 is wrapped by the bearing recess 54 over more than 180°. As a result, locking of the pivot bolt in its bearing position is achieved, in which position unintended disconnection of the wiper blade 14 from the wiper arm 12 is prevented. To enable the wiper apparatus 10 to reach its final operating position from its intermediate mounting position (FIG. 10), the wiper blade 14 must be pivoted relative to the wiper arm 12 in the direction of the arrow 63, causing the support bolt 58 to enter the transverse groove 55 (FIG. 2). The transverse groove 55, at its orifice at the top side 59 of the body 44, can likewise be provided with a constriction, which corresponds to the constriction 53 of the mounting channel 48 but whose minimum size must be adapted to the diameter of the support bolt 58. The pivot bolt 40 or its longitudinal axis forms the hinge axis, about which the wiper blade 14 executes its pivoting motion (double-headed arrow 17 in FIG. 1). In the operating position, shown in FIGS. 2 and 3, of the wiper apparatus 10, the two legs 37 of the U on the free end 11 of the wiper arm 12 fit without play over the longitudinal side walls of the coupling part 34, so that good guidance of the wiper blade 14 during wiping operation (double-headed arrow 42 in FIG. 4) is assured. Since the width of the transverse groove 55 is adapted to the diameter of the support bolt 58, the jacket face of the support bolt 58 forms a shoulder 65 for securing the pivot bolt 40 in its bearing recess 54, and a counterpart shoulder of the wiper blade is associated with this shoulder 65. This counterpart shoulder of the wiper blade is embodied on the side wall 66 of the transverse groove 55 remote from the pivot bolt or from the bearing recess 54 and cooperates with the securing shoulder of the wiper arm 12 when the wiper apparatus 10 is in the operating position (FIG. 2). The depth of the transverse groove 55 must be dimensioned such that the maximum pivoting motion (angle β in FIG. 2) required to adapt the wiper blade to the course of the window is possible without restriction.

It is quite clear from the exemplary embodiment that the mounting channel 48, viewed in cross section, has two partial channels 50 and 51, which form an angle α of less than 180° with one another, and the one partial channel 50 has the insertion opening 52 while the other partial channel 51 opens into the bearing recess 54, and in the operating position of the wiper apparatus, a shoulder 65 of the wiper arm 12 oriented transversely to the wiper blade and securing the pivot bolt 40 and its bearing recess 54 cooperates with a counterpart shoulder, associated with it, of the wiper blade that is formed by the side wall 66.

What is claimed is:

1. A wiper apparatus for windows of motor vehicles with a driven wiper arm, wherein an elongated wiper blade is separably connected by means of a connection device, wherein the wiper blade has at least two sides and wherein a wiper strip is arranged on one of the at least two sides, wherein the connection device includes a pivot bolt arranged on the wiper arm, wherein said pivot bolt defines a hinge axis that extends substantially transverse to a longitudinal direction of the wiper blade, wherein the connection device includes a coupling part, wherein said coupling part is arranged on a side of the wiper blade opposite the wiper strip, wherein the coupling part has a bearing recess and a mounting channel with an insertion opening for the pivot bolt, wherein the pivot bolt is insertable into the bearing recess via the mounting channel, wherein the coupling part has at least two sides, wherein one of the at least two sides faces toward the wiper strip and the other of the at least two sides faces away from the wiper strip, wherein the insertion opening of the mounting channel is arranged on the side of the coupling part facing away from the wiper strip, wherein the mounting channel has two part channels, wherein the two part channels form an angle α of less than 180° to one another, wherein one of the two part channels has the insertion opening for the pivot bolt and the other part channel opens into the bearing recess, wherein the connecting device has a shoulder on the wiper arm that is oriented transversely to the wiper blade, wherein said shoulder secures the pivot bolt in the bearing recess, wherein the shoulder cooperates with a counterpart shoulder of the wiper blade, and wherein the shoulder is rigidly arranged on the wiper arm relative to the pivot bolt.

2. The wiper apparatus of claim 1, characterized in that the other partial channel (51), opening into the bearing recess (54), extends in a plane that is at least approximately parallel to the window (20).

3. The wiper apparatus of claim 1, characterized in that the one partial channel (50), having the insertion opening (52), extends in a plane perpendicular to the window (20).

4. The wiper apparatus of claim 1, characterized in that the two partial channels (50 and 51) form an angle α of 90° with one another.

5. The wiper apparatus of claim 1, characterized in that the counterpart shoulder (66) of the wiper blade (14) is embodied on the coupling part (34).

6. The wiper apparatus of claim 1, characterized in that the coupling part (34) is disposed on a band side, remote from the window (20), of a band-like elongated, spring-elastic support element (32) for the wiper strip (18).

7. A wiper apparatus for windows of motor vehicles with a driven wiper arm, wherein an elongated wiper blade is separably connected by means of a connection device, wherein the wiper blade has at least two sides and wherein a wiper strip is arranged on one of the at least two sides, wherein the connection device includes a pivot bolt arranged on the wiper arm, wherein said pivot bold defines a hinge axis that extends substantially transverse to a longitudinal direction of the wiper blade, wherein the connection device includes a coupling part, wherein said coupling part is arranged on a side of the wiper blade opposite the wiper strip, wherein the coupling part has a bearing recess and a mounting channel with an insertion opening for the pivot bolt, wherein the pivot bold is insertable into the bearing recess via the mounting channel, wherein the coupling part has at least two sides, wherein one of the at least two sides faces toward the wiper strip and the other of the at least two sides faces away from the wiper strip, wherein the insertion opening of the mounting channel is arranged on the side of the coupling part facing away from the wiper strip, wherein the mounting channel has two part channels, wherein the two part channels form an angle α of less than 180° to one another, wherein one of the two part channels has the insertion opening for the pivot bolt and the other part channel opens into the bearing recess, wherein the connecting device has a shoulder that is oriented transversely to the wiper blade, wherein said shoulder secures the pivot bolt in the bearing recess, wherein the shoulder cooperates with a counterpart shoulder of the wiper blade, wherein the coupling part (34) is made from an elastically yielding plastic, and wherein the mounting channel (58) has a partial constriction (53) in a width of the mounting channel (58), wherein a width of the partial construction is less than the diameter of the pivot bolt (40).

8. A wiper apparatus for windows of motor vehicles with a driven wiper arm, wherein an elongated wiper blade is separably connected by means of a connection device, wherein the wiper blade has at least two sides and wherein a wiper strip is arranged on one of the at least two sides, wherein the connection device includes a pivot bolt arranged on the wiper arm, wherein said pivot bold defines a hinge axis that extends substantially transverse to a longitudinal direction of the wiper blade, wherein the connection device includes a coupling part, wherein said coupling part is arranged on a side of the wiper blade opposite the wiper strip, wherein the coupling part has a bearing recess and a mounting channel with an insertion opening for the pivot bolt, wherein the pivot bold is insertable into the bearing recess via the mounting channel, wherein the coupling part has at least two sides, wherein one of the at least two sides faces toward the wiper strip and the other of the at least two sides faces away from the wiper strip, wherein the insertion opening of the mounting channel is arranged on the side of the coupling part facing away from the wiper strip, wherein the mounting channel has two part channels, wherein the two part channels form an angle α of less than 180° to one another, wherein one of the two part channels has the insertion opening for the pivot bolt and the other part channel opens into the bearing recess, wherein the connecting device has a shoulder that is oriented transversely to the wiper blade, wherein said shoulder secures the pivot bolt in the bearing recess, wherein the shoulder cooperates with a counterpart shoulder of the wiper blade, wherein the securing shoulder (65) of the wiper arm (12) is disposed between the pivot bolt (40) and a guided end of the wiper arm (12).

9. A wiper apparatus for windows of motor vehicles with a driven wiper arm, wherein an elongated wiper blade is separably connected by means of a connection device, wherein the wiper blade has at least two sides and wherein a wiper strip is arranged on one of the at least two sides, wherein the connection device includes a pivot bolt arranged on the wiper arm, wherein said pivot bold defines a hinge axis that extends substantially transverse to a longitudinal direction of the wiper blade, wherein the connection device includes a coupling part, wherein said coupling part is arranged on a side of the wiper blade opposite the wiper strip, wherein the coupling part has a bearing recess and a mounting channel with an insertion opening for the pivot bolt, wherein the pivot bold is insertable into the bearing recess via the mounting channel, wherein the coupling part has at least two sides, wherein one of the at least two sides faces toward the wiper strip and the other of the at least two sides faces away from the wiper strip, wherein the insertion opening of the mounting channel is arranged on the side of the coupling part facing away from the wiper strip, wherein the mounting channel has two part channels, wherein the two part channels form an angle α of less than 180° to one another, wherein one of the two part channels has the insertion opening for the pivot bolt and the other part channel opens into the bearing recess, wherein the connecting device has a shoulder that is oriented transversely to the wiper blade, wherein said shoulder secures the pivot bolt in the bearing recess, wherein the shoulder cooperates with a counterpart shoulder of the wiper blade, wherein the wiper arm (12) has a U-shaped cross section on a free end (11), wherein two legs (37) of the U extend, fitting over longitudinal sides of the coupling part (34), from the base of the U (38) to the window (20), and that the ends of the pivot bolt (40) are retained on the two legs (37) of the U.

10. The wiper apparatus of claim 9, characterized in that the securing shoulder (65) of the wiper arm (12) is embodied on a jacket face of a support bolt (58), wherein said support bolt (58) is disposed with spacing (59) from the pivot bolt (40) and is retained with two ends at the two legs (37) of the U of the wiper arm (12).

11. The wiper apparatus of claim 10, characterized in that the counterpart shoulder (66) of the wiper blade (14) is embodied on the side wall, remote from the pivot bolt (40), of a transverse groove (55) that is disposed in the coupling part (34) and is open on the side of the coupling part remote from the window (20).

12. The wiper apparatus of claim 11, characterized in that the transverse groove (55) extends from its opening to the groove bottom (56) along a circular path, wherein a radius (60) of the circular path corresponds to the spacing (59) between the pivot bolt (40) and the support bolt (48).

13. A wiper apparatus for windows of motor vehicles with a driven wiper arm, wherein an elongated wiper blade is separably connected by means of a connection device, wherein the wiper blade has at least two sides and wherein a wiper strip is arranged on one of the at least two sides, wherein the connection device includes a pivot bolt arranged on the wiper arm, wherein said pivot bold defines a hinge axis that extends substantially transverse to a longitudinal direction of the wiper blade, wherein the connection device includes a coupling part, wherein said coupling part is arranged on a side of the wiper blade opposite the wiper strip, wherein the coupling part has a bearing recess and a mounting channel with an insertion opening for the pivot bolt, wherein the pivot bold is insertable into the bearing recess via the mounting channel, wherein the coupling part has at least two sides, wherein one of the at least two sides faces toward the wiper strip and the other of the at least two sides faces away from the wiper strip, wherein the insertion opening of the mounting channel is arranged on the side of the coupling part facing away from the wiper strip, wherein the mounting channel has two part channels, wherein the two part channels form an angle α of less than 180° to one another, wherein one of the two part channels has the insertion opening for the pivot bolt and the other part channel opens into the bearing recess, wherein the connecting device has a shoulder that is oriented transversely to the wiper blade, wherein said shoulder secures the pivot bolt in the bearing recess, wherein the shoulder cooperates with a counterpart shoulder of the wiper blade, wherein the securing shoulder (65) of the wiper arm (12) is embodied on a jacket face of a support bolt (58), wherein said support bolt is disposed with spacing (59) from the pivot bolt (40) and is retained with two ends at two legs (37) of a U-shaped cross section of the wiper arm (12), wherein a diameter of the support bolt (58) is less than a diameter of the pivot bolt (40).

* * * * *